LE VERT CLARK.
VEHICLE.
APPLICATION FILED OCT. 19, 1907.

1,069,228.

Patented Aug. 5, 1913.
3 SHEETS—SHEET 1.

Witnesses

Inventor
Le Vert Clark

LE VERT CLARK.
VEHICLE.
APPLICATION FILED OCT. 19, 1907.

1,069,228.

Patented Aug. 5, 1913.
3 SHEETS—SHEET 2.

Witnesses

Inventor
Le Vert Clark

LE VERT CLARK.
VEHICLE.
APPLICATION FILED OCT. 19, 1907.
1,069,228.
Patented Aug. 5, 1913.
3 SHEETS—SHEET 3.
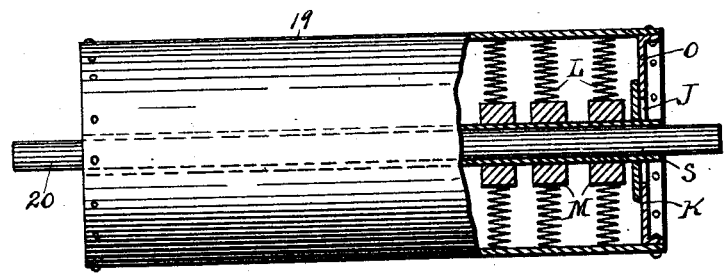
Fig. 10.
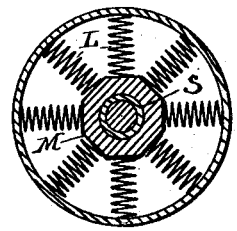
Fig. 11.
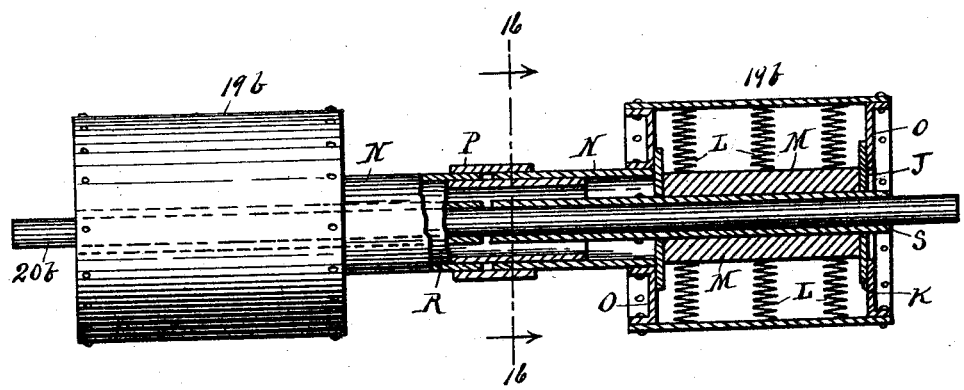
Fig. 13.
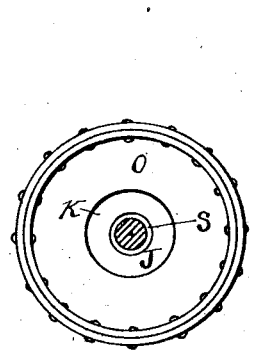
Fig. 14.
Fig. 12.
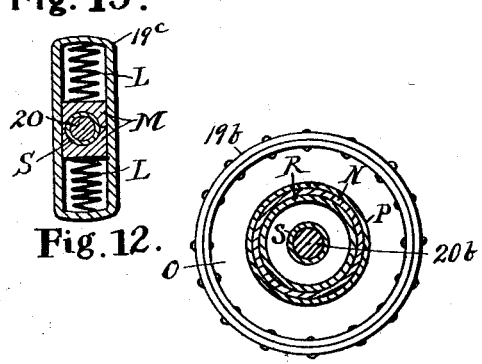
Fig. 15.

UNITED STATES PATENT OFFICE.

LE VERT CLARK, OF DETROIT, MICHIGAN.

VEHICLE.

1,069,228.　　　Specification of Letters Patent.　　　Patented Aug. 5, 1913.

Application filed October 19, 1907.　Serial No. 398,300.

*To all whom it may concern:*

Be it known that I, LE VERT CLARK, a citizen of the United States, residing at Detroit, in the county of Wayne and State of Michigan, have invented certain new and useful Improvements in Vehicles, of which the following is a specification.

This invention relates to improvements in vehicles especially of the automobile type; in which a mechanical elastic unit, hereinafter described, co-acts horizontally with other portions of the vehicle, as an integral part thereof, to sustain the vehicle body, or substitute therefor, in an elastic way by what might be termed, an arrangement of box-spring suspension for the body and ground wheels, respectively. Its further object is to bring the elastic unit into connection with girders, standards, overhang, braces, wheels, body, and other portions of the vehicle and its propelling and steering parts, in such a way as to permit the use of power applied simultaneously to the front and rear wheels, respectively, to propel and steer the vehicle; or by the slight modification of the front truck as shown, the front wheels alone may be steered in the ordinary way by stub axles while the power is applied only to the rear wheels in any of the usual ways.

Figure 1:
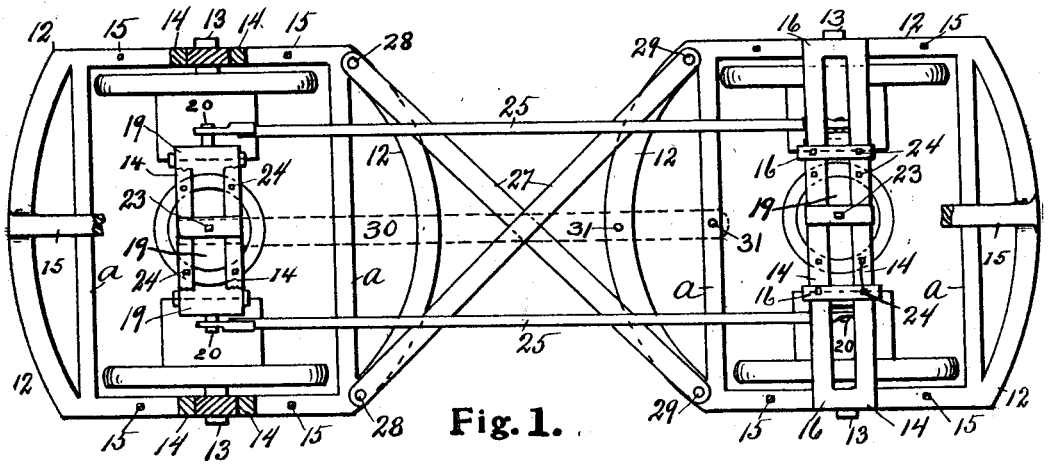
Figure 2:
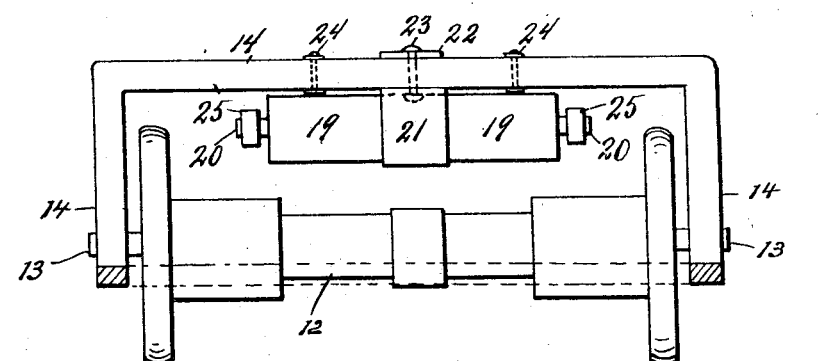
Figure 3:
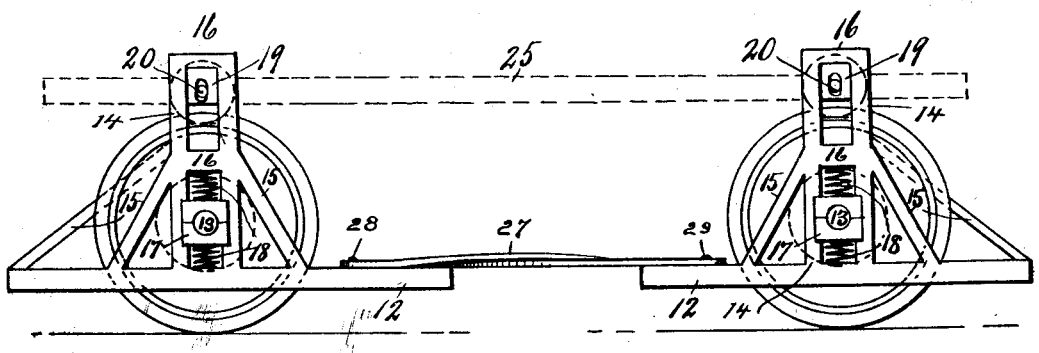
Figure 4:
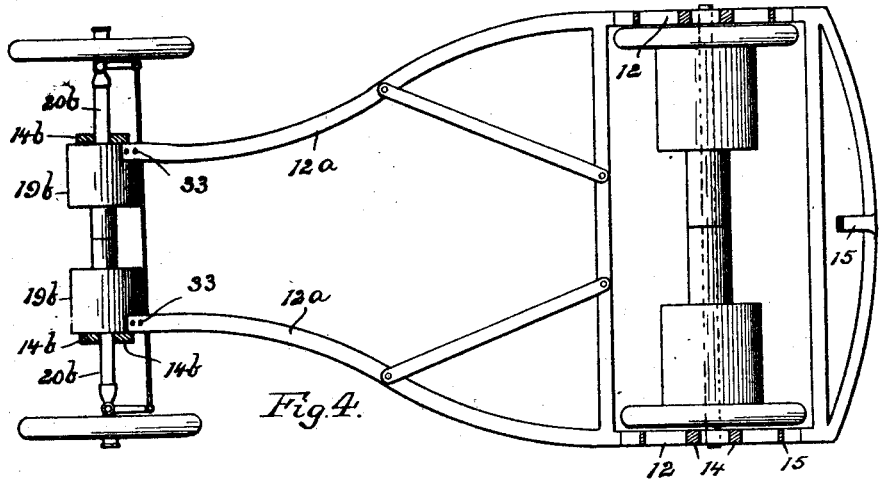
Figures 5, 6:
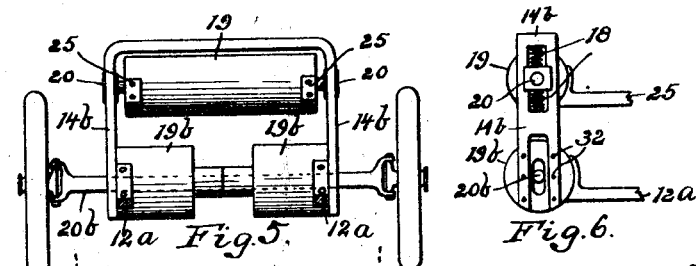
Figures 7, 8:
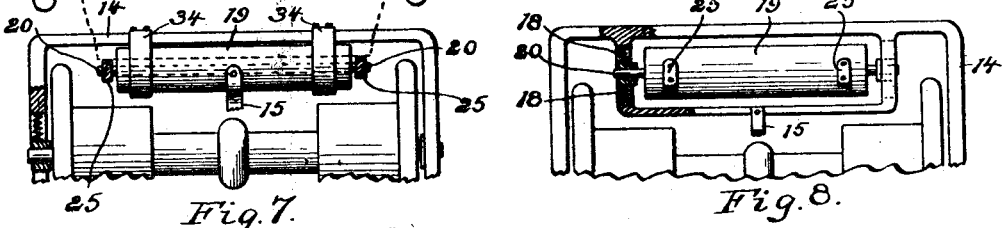
Figure 9:
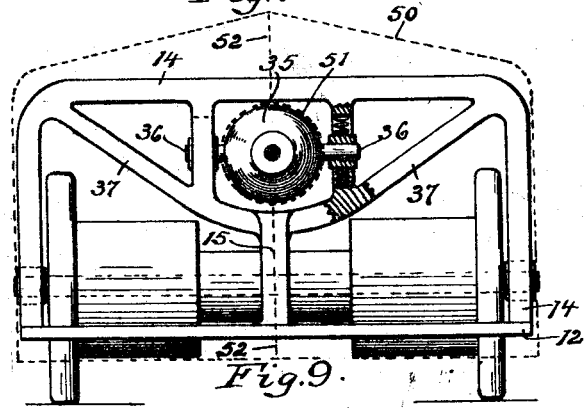

In the drawings: Figure 1 is a top view of a vehicle embodying this invention. Figs. 2 and 3 are front and side elevations of Fig. 1. Fig. 4 is a diagram of a front truck, a modified detail of the left end of Fig. 1, coupled to the rear truck, a detail of the right end of Fig. 1. Figs. 5 and 6 are rear and side elevations, respectively, of the left end or detail of Fig. 4. Figs. 7 and 8 are rear elevations of modified details of the upper right end of Fig. 4; the lower members cut away being the same as in Figs. 1 and 4. Fig. 9 is an elevation of the right end of Fig. 4 modified, the same as in Fig. 8, showing an adaptation or function of a rear truck, Fig. 2. Fig. 10 is a side elevation partly in section of the elastic unit, a detail of the vehicle. Fig. 11 is a cross-section of Fig. 10, and of the larger diameter of Fig. 13, the shaft and casing having radial oscillation relatively to each other. Fig. 12 is a cross-section of Figs. 10 and 13, modified by dispensing with the elastic elements, of said figures, except in vertical planes of oscillation and drawing in the sides of the casing to form a prism. Fig. 13 is an elevation of a detail partly cut away, or pair of casings having a waist or portions of reduced diameter, on a single shaft. Fig. 14 is an end view of Figs. 10 and 13. Fig. 15 is a cross-section on line 16—16 of Fig. 13.

Similar numerals and letters refer to similar parts throughout the several views.

12 represents the horizontal girder in which are assembled a pair of ground wheels on an axle shaft 13. Said girder may be on a line with or in the plane above or below the horizontal plane in which lies the axle shaft 13. 14 are standards rising vertically from said girders and passing across and down to the same or a similar girder opposite. I designate the horizontal portion of the standard as the "overhang".

15 are braces to stiffen the girders 12 and frame in relation to the standards and overhang; other struts, braces and drop portions of overhang may be used as needed, as in Figs. 8 and 9.

16 are braces connecting parallel portions of the overhang.

17 and 18 are ordinary journal boxes and bolster springs for the wheel axle, and shaft similarly placed in standards and the like verticals, connected to the overhang, Figs. 8 and 9.

19 is a casing portion of the elastic unit of Fig. 10, the same as 19$^b$ of Fig. 13 and 19$^c$ of Fig. 12,—the latter being of prismatic form, making a box casing for the resilient element oscillating only vertically as hereinafter described. 20 is a shaft longitudinal therethrough and designated as 20$^b$ when it co-acts with the ground wheels in the ordinary way as shown in Fig. 5.

21 is a collar around the middle of the casing and designated by 34 when around the ends, as shown in Fig. 7.

22 is a plate attached to the overhang. 23 is a king-bolt, which may extend downward as far as desired, co-acting with the casing 19; it forms the axis of an ordinary "fifth wheel" placed between the overhang and casing. The upper half of the "fifth wheel" is attached to the overhang by bolts 24 and the lower half to the casing 19 of Fig. 2 in a similar way (not shown) by which means the wheel axle may be turned in either direction like the front truck of an ordinary vehicle.

*a* is a cross brace.

25 are the side bars or floor sills, of a vehicle body, which may be attached to the unit by its shaft 20 of Figs. 1 and 7 or to the casing 19 of the unit, in Figs. 5 and 8.

27 are reach poles connecting the forward to the rear truck member by bolts 28 and 29. 30 is another ordinary form of reach which may be fastened to the rear truck at 31 co-acting with the king-bolt and the fifth wheel, in the way of the ordinary wagon pole, not necessary to illustrate. Other forms of reaches may be used to couple the trucks together; for example, 12ª attached at 33 of Fig. 4 when the forward is of different construction from the rear truck, as is usually the case with ordinary vehicles.

I make no specific claims for the means illustrated to couple the front and rear trucks together, whether they are either of the same or of different construction and operation.

In Fig. 5, the lower ends of the standards 14ᵇ are attached to the ends or closures of the casing's unit 19ᵇ; they being the same as the standard 14 and casing 19 when differently placed; whereby the ground wheels may support the ends of the unit's shaft 20ᵇ in the usual way, by stub axle, common to front trucks of ordinary automobiles, not necessary to particularly describe. The shafts may be fixed or revolubly placed inside the casings, as may be desired, to meet the usual conditions where used. In the upper portions of the truck they would be preferably dead and in the lower they may be either "dead" or "live" axles. The usual side thrust bearings and collars, not shown, will keep them in place.

The upper shaft 20 may be suspended below the overhang between the standards acting as guides to hold journal boxes, holding the shaft, having bolster springs above and below the boxes in a way similar to that of the axle 13 in Fig. 3.

The vehicle body 25 has additional resiliency from the springs inside the casing 19 as will be hereinafter described. The front or the rear truck member of Fig. 4, modified in Figs. 7 and 8, differs from Fig. 2 only in the method of suspending the upper elastic unit which is apparent on inspection without especial differentiation. Fig. 9 is a rear truck member the same in its essential overhang as that in Figs. 2, 4, 7, and 8, with reinforcing struts 37, supporting any heavy body; for instance, a light cannon 35 on its trunnions 36 which to all intents and purposes is the same as casing 19 and shaft 20 of Fig. 8, mounted in drop portions of the overhang, they being verticals or standards, and like them, connected to the overhang.

Having described the means of using the unit in the vehicle of my invention, whose front and rear truck members are of different construction and capable of slight modification in the same species of vehicle, and which are further capable of being coupled, the two front truck forms together, or the two rear truck forms together, or the front and rear truck forms making a single vehicle,—I will now describe the elastic unit itself, the basis of the device as shown in Figs. 10, 12, and 13.

To summarize, 19 and 19ᵇ are casings similar to each other which may preferably be modified to a box like or prismatic form 19ᶜ in Fig. 12, when used as in Fig. 5 and in the upper portion of the other figures. The cross-section Fig. 12, differs only from Fig. 11 in the absence of all resilient elements inside the casing except in lines vertical, above and below, the normal horizontal plane in which lies the shaft. 20 is a shaft somewhat longer than the casing; and 20ᵇ the shaft when two casings are combined on the shaft which may be preferably placed eccentric with the casing 19ᶜ to give greater vertical elasticity between the shaft and the upper or lower side of the casing from whence comes the greater weight or force to resist. For instance, place the shaft above the center of the upper and below the center of the lower casing, in the prismatic form in Fig. 12; which although more desirable is not necessary to its action as the shaft may be concentric with the casings as shown. In any event the shaft and casing become eccentric with each other in Fig. 12, under the heaviest load without buckling or injury to the springs; wherein this construction differs from all other devices.

S is a tube in which the shaft is placed and easily removable therefrom.

O is the end closure perforated at J to allow the shaft and casing to freely oscillate relatively to each other without contact. K is a closure to cover and slide over said perforation. The resilient element in this instance is represented by spiral springs L, seated vertically to the horizontal plane of the shaft, in Fig. 12, and radially in Figs. 10 and 13, though other resilient elements may be so employed between the shaft and casing.

M is a medium upon which the springs are seated.

In Fig. 13 there are two casings 19ᵇ placed on a single shaft 20ᵇ having a reduced portion or waist N around which may be telescoped a larger tube P, and inside a similar tube R, both to give stiffness to the casings in relation to the shaft 20ᵇ. The waist may be used as a seat or place for driving gear-wheels and differential gears in the ordinary way if the unit is to revolve as shown in the lower portion of Fig. 2 and in other rear truck members. The larger portion 19ᵇ may be used in co-action with wheels circumscribing the same, whereby each wheel will turn on the axle 13 independently of the other in rounding curves, or the wheels connected to shaft 20ᵇ, Fig. 5.

The operation of the unit is such that when the casings are held stationary, the inside shaft may be freely oscillated relatively thereto within the limits of its movement, which is vertical only in Fig. 12 and radially in the other figures; and conversely, when the shaft is stationary the casing may be oscillated in the same way. The sides of the casings may be opened up or cut away, as much as need be, to give access to the shaft inside for the purpose of inspection, repairs, or for placing propelling or other connections upon the shaft for operating the same, without impairing the resiliency, strength, or efficiency of the unit. The casing also affords places or seats for attaching other co-acting parts of the vehicle or the driving and stopping devices in the ordinary way not necessary to illustrate. The unit with the co-acting parts is an integral part of the vehicle itself and absorbs jolts, strains and stress and transmits the shock in a milder form to the body portion. The component parts may be made light or heavy, as to meet all conditions of the lightest or heaviest possible traffic in pleasure or commercial vehicles, and the greatest resiliency attained by simply grading the size and number of springs to be used, whereby pneumatic tires and leaf springs may be done away with; and the danger, annoyance and great expense attendant upon their use, under heavy loads or ordinary speed, entirely cease.

What I claim is:

1. In a vehicle, the combination, with the running gear, of an elastic unit forming an integral part thereof, furnishing spring support to the vehicle and for other purposes; which unit embodies a horizontal shaft, of a length approximating the width of the vehicle, circumscribed by a casing somewhat shorter than the shaft, both axially transverse to the vehicle; a perforated closure secured on each end of the casing through which the shaft protrudes; the perforations being of such size and shape as will permit the shaft and casing to freely oscillate transversely to each other the width of the vehicle within the limitations of their action; a plurality of bolster springs inside the casing resiliently supporting and spacing only in the planes of oscillation the shaft and casing relatively to each other; and means for operatively connecting respectively, other portions of the running gear, also the wheels and body sills to the unit only at its ends nearest each respective side of the vehicle, and to portions of the unit substantially midway between its ends, as may be respectively required in the construction and operation of the vehicle.

2. In a vehicle, the combination, with the running gear, of an elastic unit, forming an integral part thereof, furnishing spring support for the vehicle and for other purposes; which unit comprises a horizontal non-rotatable prismatic casing member circumscribing a shaft longer than the casing; a perforated closure on each end of the casing to which it is attached; the perforations being relatively of such length as will permit the shaft protruding at each end to freely oscillate therein, only in substantially vertical planes within the limitations of its action; and bolster springs placed, to act only vertically, inside the casing, relatively supporting the shaft and casing and omitted in other directions radial to the shaft, so that there will be no relative resiliency except as stated in substantially vertical planes in which the shaft and its casing are limited to oscillate transversely to each other.

3. In a vehicle, the combination, with the running gear, of an elastic unit forming an integral part thereof, of a length approximating the width of the vehicle, furnishing spring support for the vehicle and for other purposes; which unit comprises a horizontal casing made into two similar sections axially transverse to the vehicle and circumscribing a single shaft somewhat longer than the casing; a perforated closure on the end of each section, to which it is secured, the perforations being of such size and shape as will permit the protruding shaft to freely oscillate therein within the limitations of its action the width of the vehicle; means, for connecting and holding the sections in axial line with each other, self contained as to the unit irrespective of the shaft and vehicle body and sills, which may lessen the weight without operatively impairing the practical axial continuity of the unit's casing; bolster springs inside the casing, relatively supporting the shaft and casing when oscillating transversely to each other within the said limitations of their action; and means for connecting the unit to other portions of the running gear, to the wheels and to the body sills as may be respectively required in the construction and operation of the vehicle.

4. In a vehicle, a truck having in combination two horizontal shafts one in a plane above the other, placed transversely to and forming a part of the running gear and approximating in length the width of the vehicle; each single shaft being circumscribed by a casing somewhat shorter than the shaft; springs inside each casing relatively supporting the shaft and casing; each of which casings containing springs and shaft constituting an elastic unit furnishing spring support to the vehicle and for other purposes; sills of the vehicle body operatively connected only to the outer ends of the upper unit; and ground wheels of the vehicle operatively connected to the outer ends of the lower unit; the upper and lower units being operatively assembled together within opposite vertical portions, of the truck frame, having their tops joined across the truck by an overhang portion of the running gear, substantially as described.

5. In a vehicle, a truck having in combination an overhang connecting the tops of opposite standards secured at their bases to the running gear; a wheel axle shaft, oscillating vertically on said standards as guides; a horizontal casing, of a length approximating the width of truck operatively connected to the running gear above the axle shaft, circumscribing a second shaft somewhat longer than the casing and extending through it; and springs placed inside the casing relatively supporting said casing and shaft; which casing, its shaft and springs together constitute an elastic unit supporting the end of the vehicle body by means of its floor sills, each sill being operatively connected only to the outer end of the elastic unit, substantially as described.

6. In a vehicle, a truck having in combination two elastic units; each unit having a horizontal casing, approximating in length the width of the vehicle placed transversely thereto, and circumscribing a shaft longer than the casing; springs inside the casings resiliently supporting the shafts, so that the casings and shafts may oscillate within the limitations of their action; the units being operatively assembled in a frame having opposite standards connected by an overhang; and vehicle body sills connected to the upper unit and vehicle wheels operatively connected to the lower unit.

7. In a vehicle truck, the combination of a horizontal portion of a truck frame called its " overhang," which overhang connects together, across the vehicle, the tops of a plurality of vertical guides secured and braced to the truck frame itself; a bearing member, on each side of the truck for a shaft journal and the like, held by the verticals and sliding therebetween; the bearings being placed in a horizontal plane below the overhang and above the wheel axle and capable of oscillating independently of the wheel axle, which bearings being intended to sustain the load carried by the truck by means of the said shaft journal resting upon the bearings; which journal is operatively connected to and supports a vehicle body and the like; the bearing being capable of oscillating in the vertical guides to and from the overhang; the vehicle body and the like not being otherwise supported by the overhang and the verticals; springs seated on the bearings to give elasticity to the load; and a separate wheel axle shaft, in a horizontal plane below the aforesaid bearings, having its own bearings independent of the others, upon which axle rests the framework of the truck supported by the axle to which it is operatively connected, substantially as described.

8. In a vehicle, a truck having in combination a wheel axle shaft and vehicle wheels operatively connected therewith, on which shaft journal boxes are mounted to slide in standards vertically placed and secured to a horizontal girder outside the wheels; bolster springs above and below said journal boxes; and a horizontal overhang connecting the tops of similar standards on opposite sides of said truck, which frame is a portion of the running gear supported by the said bolster springs over said journal boxes upon the wheel axle shaft, substantially as described.

9. In a vehicle, a truck having in combination a horizontal girder engaging with an axle shaft of the vehicle wheels by means of journal boxes placed on said wheel axle, so as to slide vertically in standards secured and braced to said girder on opposite sides of the truck; an overhang connecting the top of said opposite standards; an elastic unit casing connected, at its middle, midway to said overhang; a longitudinal shaft through the casing; springs inside the casing supporting the shaft and casing relatively to each other; perforated closures on the ends of the casing; a fifth wheel placed between said casing and said overhang portion; vehicle body sills supported by the shaft of the unit; and means to connect, in alternate relation, the truck to another truck member.

10. In a vehicle, a truck having in combination a pair of elastic horizontal units in different planes, one above the other; each of which units consists of a casing portion, perforated closures covering the ends of said casing; a shaft extending longitudinally through the casing for outside support at each end of the shaft; springs inside each casing supporting the shaft and casing relatively to each other; vertical standards attached to each lower unit; an overhang connecting the tops of one of said standards to the top of an opposite standard similarly placed; journal boxes mounted to slide upon each of the standards acting as guides; vehicle wheels operatively connected with the shaft of the lower unit and vehicle body sills supported by the upper unit; and means for connecting said truck to another truck.

11. In a vehicle, a truck having in combination a horizontal overhang; vertical standards supporting each end of the overhang; secured and braced to horizontal girders; a horizontal casing of the elastic unit, connected to said overhang; a shaft extending longitudinally through said casing to engage with other parts of the running gear outside the casing; a tube inside the unit around said shaft; springs inside the casing supporting said shaft and casing relatively to each other; perforated closures secured to the ends of the casing; and vehicle body sills supported by the shaft portion of said casing, substantially as described.

12. In a vehicle, a truck having in combination a wheel axle shaft, operatively connected to vehicle wheels, assembled in said truck; a horizontal curved girder connected to said shaft which supports it; standards arising from and secured to said girder on each side of the truck; an overhang extending in a general direction parallel with the axle from the top of one standard to the top of the opposite standard on the same truck; braces and rods connecting the overhang to the said girder; verticals on each side of the truck secured to the said overhang; said vertical portions of the running gear acting as guides to journals mounted to slide only vertically thereon and bolster springs above and below said journals, substantially as described.

13. In a vehicle, a truck having in combination a horizontal elastic unit, consisting of a casing portion; perforated closures covering the ends of said casing; a shaft extending longitudinally through the casing sufficiently far, outside the casing to engage on each end of the shaft in the usual way with a vehicle wheel; springs in the casing supporting the shaft; the ends of the vehicle body sills supported by the casing of the unit; and means for coupling the truck to another truck.

14. In a vehicle, a truck having in combination, a pair of the described elastic units in horizontal planes, one above the other; each of which units is of a length approximating the width of the vehicle and consists of a casing portion; perforated closures covering the ends of the casing; a shaft extending longitudinally through each casing sufficiently far for outside bearings or support at each end of the shaft; tubes inside the units inclosing each shaft; springs inside each casing supporting the shaft and tubes; means to connect said units operatively together in the said horizontal planes; and vehicle wheels engaging in the usual way with the ends of the shaft of the lower unit and vehicle body sills supported by the upper unit.

15. In a vehicle, a truck having in combination, a pair of elastic units each of a length approximating the width of the vehicle, placed in different planes, one above the other, each of which units consists of a casing portion, perforated closures closing the ends of said casing; a shaft extending longitudinally through each casing sufficiently far for outside support at each end of the shaft; tubes inside each unit around the shaft; springs inside each casing supporting the shaft; means for operatively connecting the said units in such a way that the lower unit may turn in the arc of a horizontal circle while the upper unit remains relatively stationary as to said lower unit; vehicle body sills supported by the upper unit; vehicle wheels engaging with the lower unit; and means to couple said truck to another truck.

In testimony whereof I affix my signature in presence of two witnesses.

LE VERT CLARK.

Witnesses:
E. S. WHEELER,
I. G. HOWLETT.